United States Patent

Aronne

Patent Number: 5,301,903
Date of Patent: Apr. 12, 1994

[54] OCCUPANT ARM AND HEAD RESTRAINING ASSEMBLY

[75] Inventor: Armand J. Aronne, Massapequa, N.Y.

[73] Assignee: Grumman Aerospace Corporation, Bethpage, N.Y.

[21] Appl. No.: 43,545

[22] Filed: Apr. 6, 1993

[51] Int. Cl.$^5$ ............................................. B64D 25/115
[52] U.S. Cl. .............................. 244/122 AG; 280/748; 297/466
[58] Field of Search ........ 244/122 AG, 122 R, 151 R; 297/466, 216; 280/748, 801 R

[56] References Cited

U.S. PATENT DOCUMENTS

| | | | |
|---|---|---|---|
| 3,202,384 | 8/1965 | Martin | 244/122 AG |
| 3,218,103 | 11/1965 | Boyce | 244/122 AG |
| 3,424,408 | 1/1969 | Martin | 244/122 R |
| 3,645,480 | 2/1972 | Forman | 244/122 AG |
| 3,905,615 | 9/1975 | Schulman | 244/122 B |
| 4,081,156 | 3/1978 | Ideskär | 244/122 AG |
| 4,179,086 | 12/1979 | Yamada | 244/122 AG |
| 4,215,835 | 8/1980 | Wedgwood | 244/122 AG |
| 4,359,200 | 11/1982 | Brevard et al. | 244/122 AG |
| 4,482,112 | 11/1984 | Cummings | 244/122 AG |
| 4,592,523 | 6/1986 | Herndon | 244/122 AG |
| 4,676,462 | 6/1987 | Martin | 244/122 AG |
| 4,720,064 | 1/1988 | Herndon | 244/122 AG |
| 4,749,153 | 6/1988 | Herndon | 244/122 AB |
| 5,072,896 | 12/1991 | McIntyre et al. | 244/122 AF |
| 5,072,897 | 12/1991 | Aronne | 244/122 AG |

*Primary Examiner*—Michael S. Huppert
*Assistant Examiner*—Anne E. Bidwell
*Attorney, Agent, or Firm*—Bacon & Thomas

[57] ABSTRACT

An assembly for restraining the upper limbs of an occupant of a seat, particularly an aircraft ejector seat, includes a storage unit which is adapted to be fixedly secured to an upper back portion of the seat. The storage houses a pair of movable cover members and first and second bladder units. The cover members and bladder units are connected by means of straps to a quick release mechanism which mates with a corresponding fitting carried by the occupant and then to a fixed structure adjacent the seat. When it is desired to deploy the restraint assembly, a tension is applied to the straps which causes the cover members to extend around opposite sides and laterally inward of the occupant's body, about respective arms of the occupant, and the bladder units to extend about the occupant's neck. The bladder units are then inflated so as to permit undesirable movement of the occupant's head.

14 Claims, 4 Drawing Sheets

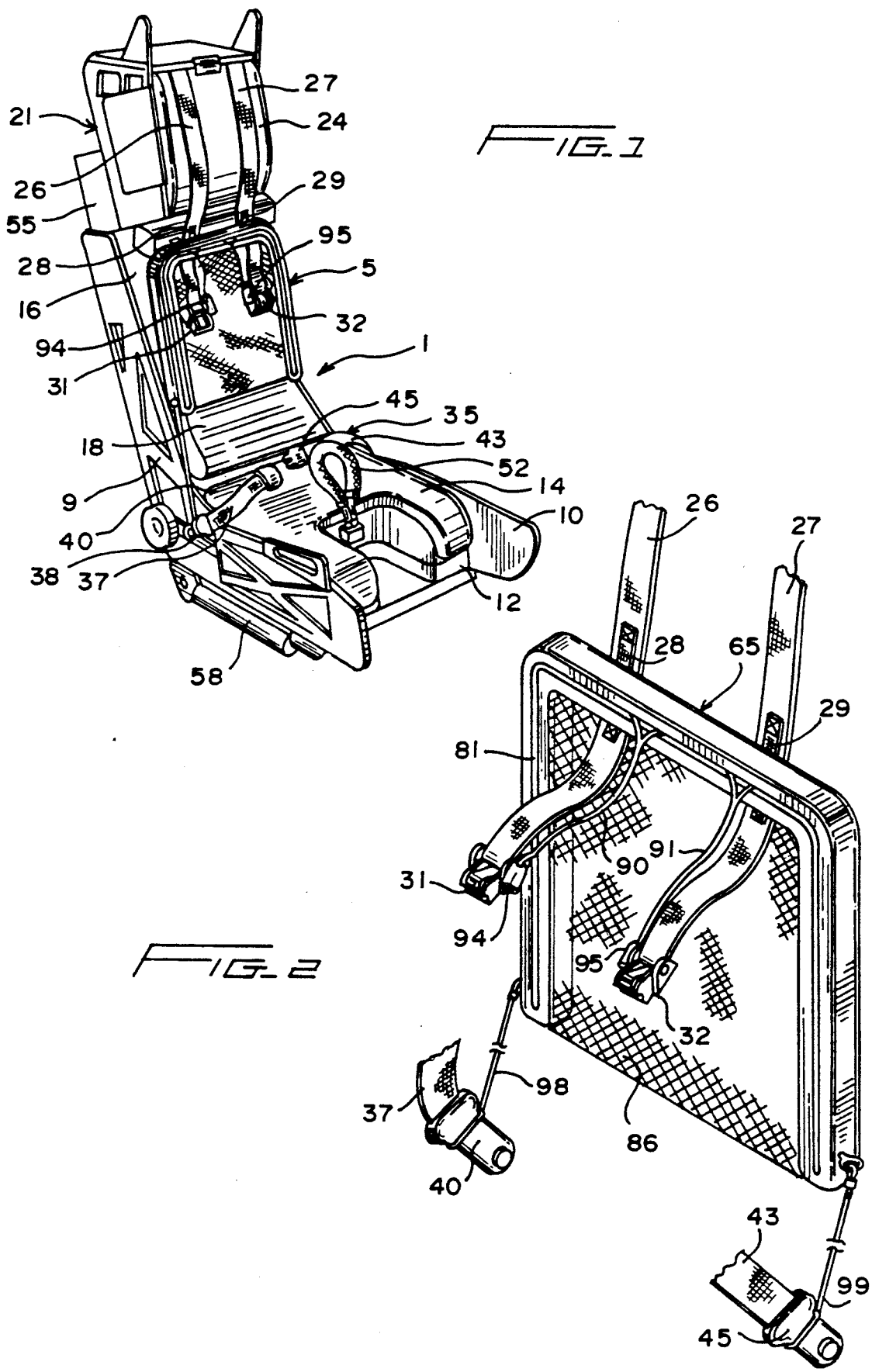

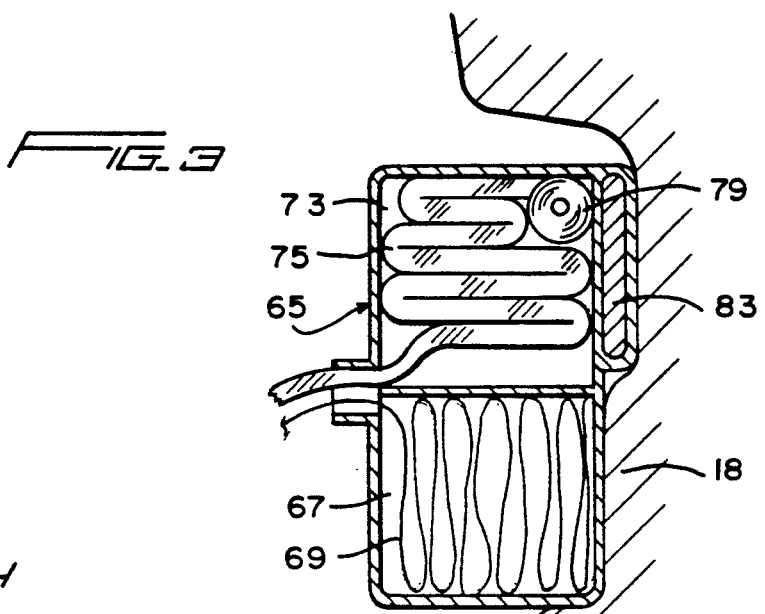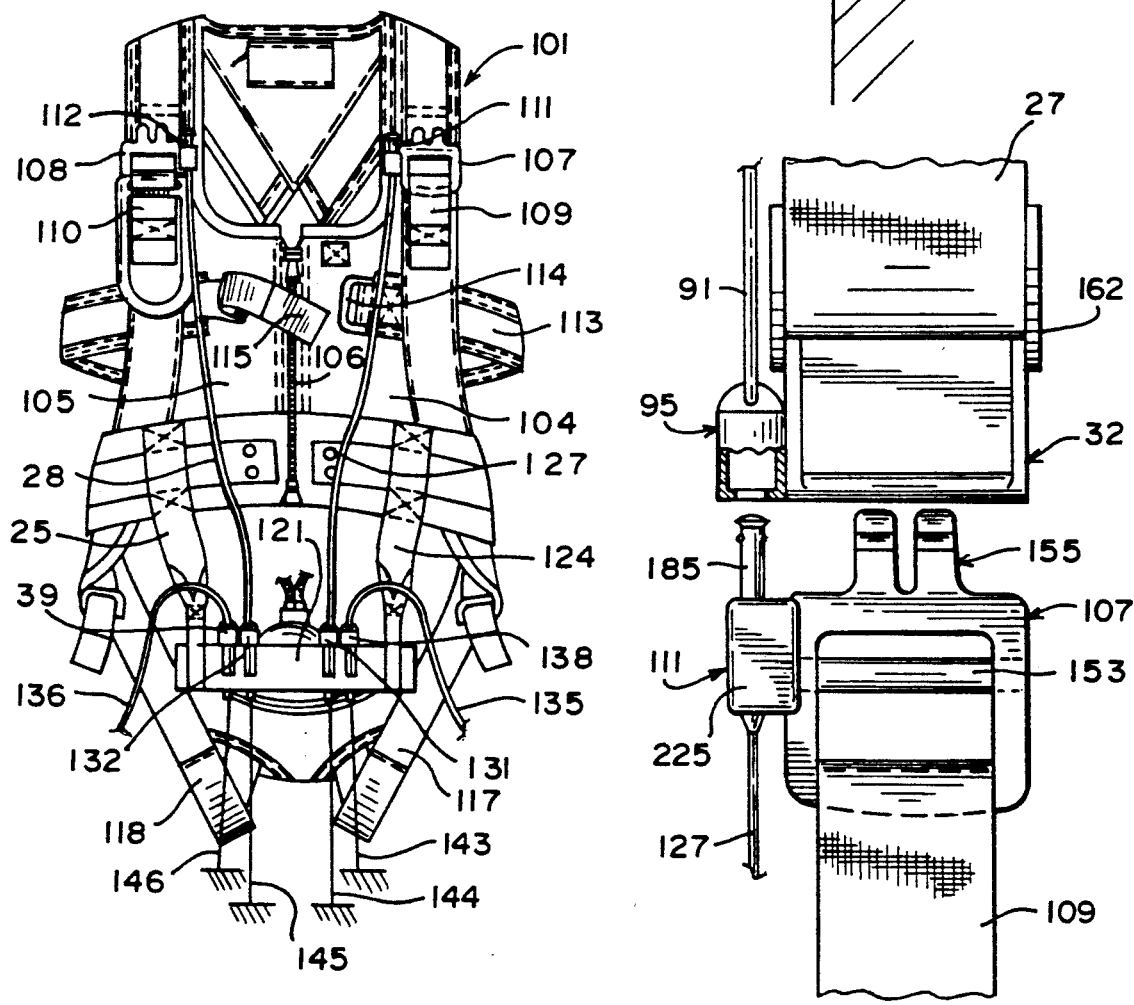

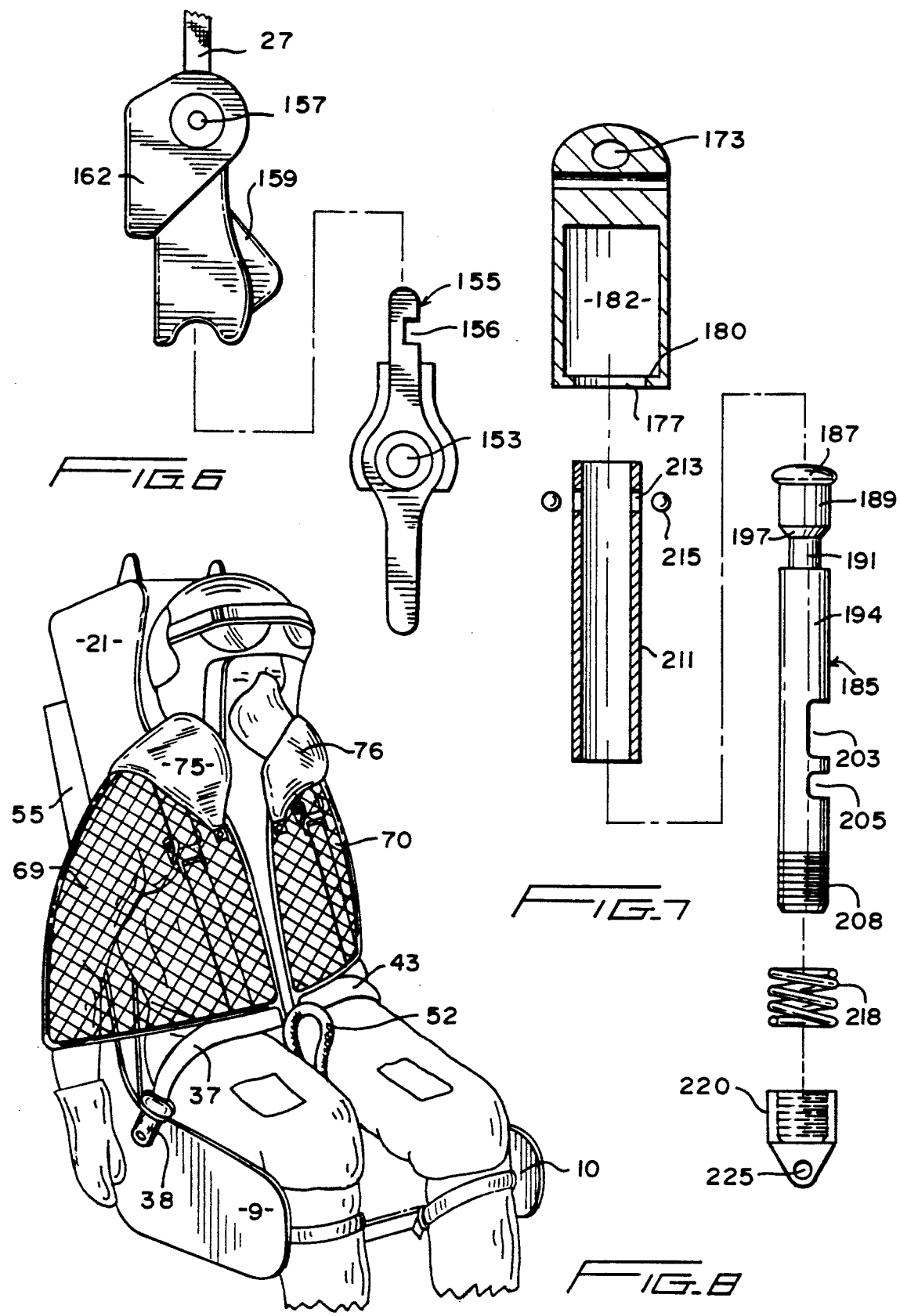

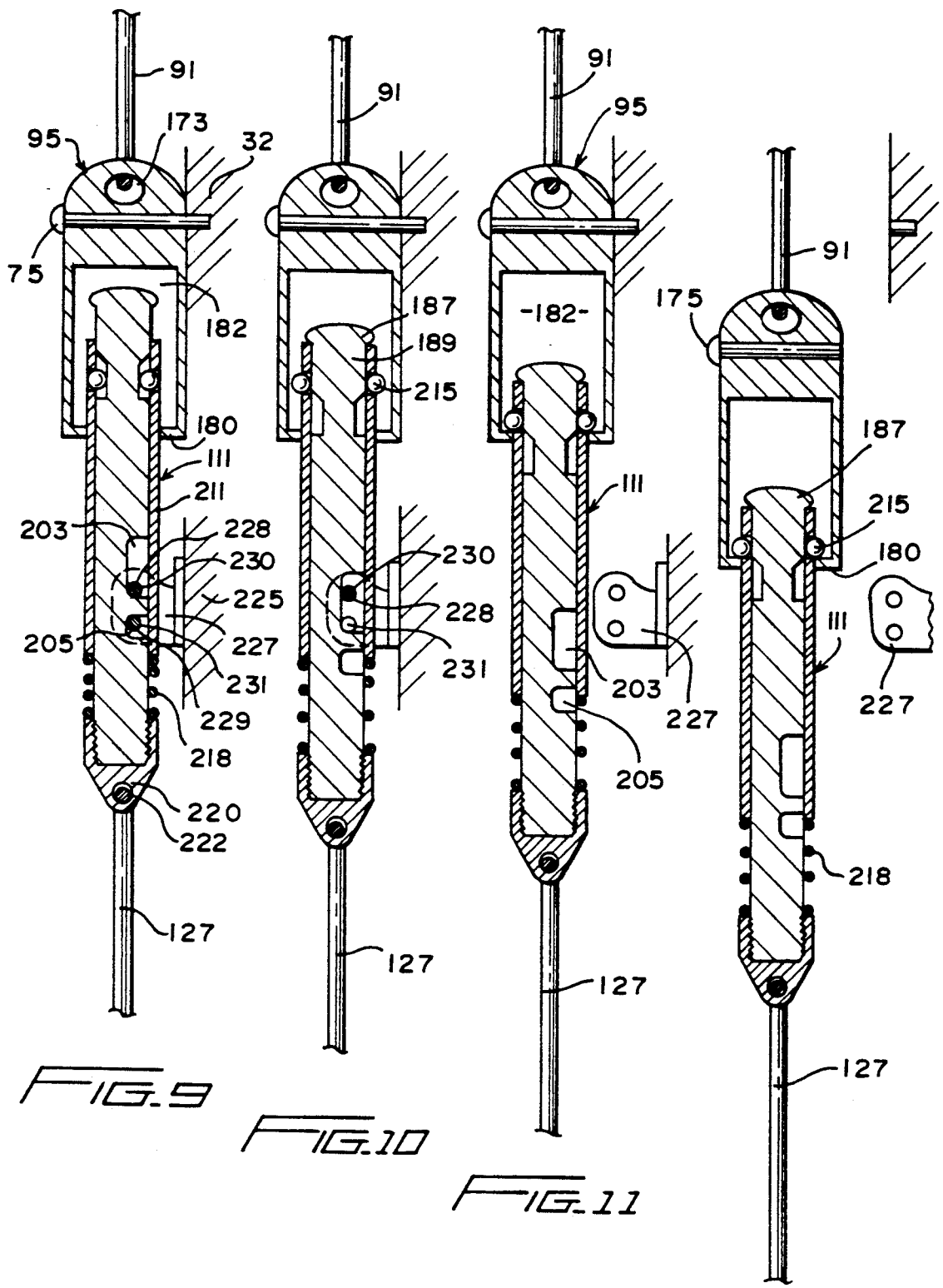

OCCUPANT ARM AND HEAD RESTRAINING ASSEMBLY

BACKGROUND OF THE INVENTION

1. Field of the Invention

The present invention pertains to a restraint assembly and, more particularly, to a restraint assembly adapted for use in combination with an aircraft ejector seat so as to restrain the movement of an occupant's arms and head during an ejection sequence.

2. Discussion of the Prior Art

Ejection seats for use in aircrafts are widely known in the art. A problem has been encountered in the prior art wherein if the occupants's limbs are spread away from the occupant's body during an ejection sequence, serious injuries, including loss of the limbs, can occur as the seat is propelled out of the aircraft.

This problem has been recognized in the prior art and attempts have been made to solve the problem by incorporating a restraint assembly having straps secured to each of the occupant's arms and legs which are tightened during an ejection sequence so that the occupant's limbs are drawn close to the body of the occupant. An example of such a prior art device is disclosed in U.S. Pat. No. 3,202,384.

Such a prior art arrangement has various undesirable characteristics. For instance, it can be difficult to secure the straps to each of the occupant's arms without assistance. In addition, the straps must accommodate, without hindering, all necessary movements of the occupant's limbs. Finally, in practice, it has been found that such systems are cumbersome.

It has also been proposed in the prior art to incorporate arm restraining net systems on ejector seats as exemplified by U.S. Pat. Nos. 4,081,156, 4,215,835 and 4,592,523. Unfortunately, these known systems fail to solve the problem associated with the prior art in a completely effective and cost-efficient manner. For instance, the arm restraining net systems in '156 and '835 patents not only require additional structural changes to the ejector seat itself in order to shift the arm restraining systems between stored and deployed positions, but the restraining nets only prevent the occupant's arms from movement laterally outwardly due to the limited travel of the netting about the occupant's body.

The restraining net system disclosed in the '523 patent, in addition to requiring substantial changes to the ejector seat, must be designed to the general size of the occupant in order to be effective, especially with regards to restraining the movement of the occupant's head, and is considered to be unreliable due to the manner of deployment and complex construction.

Therefore, there exists a need in the art for an occupant restraining system which can be readily adapted for use on an aircraft ejector seat or the like and which will reliably and efficiently restrain the movement of an occupant's upper limbs, including head, during prerequisite times such as during an ejection sequence.

SUMMARY OF THE INVENTION

It is an object of the present invention to provide an assembly for restraining the movement of the upper limbs of an occupant of a seat, such as an aircraft ejector seat, wherein the restraint assembly can be readily adapted for use on existing seat units.

It is another object of the present invention to provide a restraint assembly which can be effectively used with seat occupants of various sizes.

It is an additional object of the present invention to provide an assembly for restraining the upper limbs of an occupant in combination with an aircraft ejector seat.

These and other objects of the present invention are accomplished by providing an occupant restraint assembly adapted for attachment to a seat, such as an aircraft ejector seat, to restrain movement of the upper limbs of an occupant thereof upon occurrence of a prerequisite condition, such as seat ejection. The restraint assembly includes a storage unit which is adapted to be fixedly secured to an upper back support portion of the seat. The storage unit houses a pair of movable cover members along with first and second bladder units. The cover members and bladder units are connected by means of straps to a quick release mechanism which is adapted to mate with a corresponding fitting carried by the occupant. The occupant carried fitting indirectly attaches the strap to a floor or other fixed structure adjacent the seat. When it is desired to deploy the restraint assembly, a tension is applied to the straps which causes the cover members to extend around opposite sides and laterally inward of the occupant's body, about respective arms of the occupant, and the bladder units to extend about the occupant's neck. The bladder units can then be inflated by means of an incorporated inflation unit so as to prevent any undesirable movement of the occupant's head.

Further objects, features and advantages of the present invention will become more readily apparent from the following detailed description of a preferred embodiment thereof when taken in conjunction with the drawings wherein like reference numerals refer to corresponding parts in the several views.

BRIEF DESCRIPTION OF THE DRAWINGS

FIG. 1 is a perspective view of an aircraft ejector seat incorporating a restraint assembly according to the present invention.

FIG. 2 is an enlarged view of the restraint assembly shown in FIG. 1, along with attachment members therefor.

FIG. 3 is a cross-sectional side view of the restraint assembly shown in FIG. 2.

FIG. 4 depicts an occupant harness assembly used in combination with the ejector seat and restraint assembly shown in FIG. 1.

FIG. 5 depicts a connection assembly incorporated in the present invention.

FIG. 6 depicts a side view of the connection assembly shown in FIG. 5.

FIG. 7 is an exploded view of a portion of the connection assembly shown in FIG. 5.

FIG. 8 shows the restraint assembly of FIG. 1 in a deployed position about an upper body of an occupant of the ejector seat.

FIG. 9 depicts the connection assembly shown in FIG. 7 in its assembled and initial connecting state.

FIG. 10 depicts the connection assembly of FIG. 9 in an initial locking position.

FIG. 11 depicts the connection assembly of FIG. 9 in a fully locked position.

FIG. 12 indicates the manner in which the connection assembly of FIG. 9 transmits a deploying tension to the restraint assembly of FIGS. 1-3.

DETAILED DESCRIPTION OF A PREFERRED EMBODIMENT

Initially, reference will be made to FIG. 1 which depicts an ejector seat 1, adapted to be mounted within an aircraft (not shown), to which is secured an occupant restraint assembly 5 according to the present invention. Ejector seat 2 includes side panels 9 and 10, a seat including a seat bottom portion 12 having an associated cushion 14 and a substantially upright back support portion 16 having an associated cushion 18, and a parachute riser assembly generally indicated at 21 which includes a parachute 24. Parachute riser assembly 21 further includes a pair of riser straps 26 and 27 which are secured within parachute riser assembly 21 to inertia wheels (not shown). Riser straps 26 and 27 extend downwardly over an upper section of back support portion 16 and have secured thereto respective flap members 28 and 29 for the reasons which will be more fully discussed below. The lower ends of riser straps 26 and 27 have attached thereto respective buckles 31 and 32 which will also be more fully described hereinafter.

Ejector seat assembly 1 further includes a lap belt unit 35 comprising a first belt member 37 having one end 38 attached to side panel 9 and a second end provided with a connector 40, along with a second belt member 43 having one end (not shown) secured to side panel 10 and a second end provided with a connector 45. In the preferred embodiment, both connectors 40 and 45 comprise male-type connecting units as best indicated in FIG. 2, however, as will become more fully apparent from the additional description below, various types of connectors can be used. Ejector seat assembly 1 further includes an ejection control handle 52 which is adapted to actuate a catapult unit 55 in a manner known in the art. As the catapult arrangement is not an aspect of the present invention, it will not be further discussed in detail herein. Finally, a rocket motor is indicated at 58 in FIG. 1 for the sake of completeness.

Reference will now be made to FIGS. 1-3 and 8 in describing the particular structure of occupant restraint assembly 5. Occupant restraint assembly 5 includes a generally U-shaped storage unit 65 having a first compartment 67 which is adapted to stow a pair of cover members 69 and 70 and a second compartment 73 within which is stored a pair of inflatable bladder units 75 and 76. Also mounted within second compartment 73 is an inflation bottle 79 which is adapted to be triggered to supply an inflation medium into inflatable bladder unit 75 and 76 subsequent to actuation of the ejection system of ejector seat assembly 1 through the use of ejection control handle 52. The specific inflation system utilized with the occupant restraint assembly 5 of the present invention can take the form of any inflation system known in the art for use with inflatable safety restraint systems and therefore the particular structure thereof will not be outlined herein.

As best shown in FIG. 2, storage unit 65 is provided with a slot 81 about its front perimeter and is secured to back support portion 16 of ejector seat assembly 1 by means of an attachment belt 83 (see FIG. 3). Attachment belt 83 is also adapted to extend through flap members 28 and 29 on riser straps 26 and 27. Riser straps 26 and 27 are arranged to extend between storage unit 65 and back support portion 16 by extending through openings (not shown) between storage unit 65 and a netting 86 which extends across U-shaped storage unit 65. In the preferred embodiment, netting 86 is also adapted to be attached to back support portion 16 by means of VELCRO or other similar attachment arrangements known in the art.

As stated above, cover members 69 and 70, which in the preferred embodiment comprise nettings as best shown in FIG. 8, are adapted to be stowed within their respective compartments 67 and 73 and are adapted to be moved to a deployed position during an initial ejection phase of ejection seat assembly 1 from the aircraft. Inflatable bladder units 75 and 76 are adapted to be deployed simultaneously with cover members 69 and 70 since each of these members are attached to respective straps 90 and 91. More specifically, cover members 69 and inflatable bladder unit 75 are attached to strap 90 and cover member 70 and inflatable bladder unit 76 are attached to strap 91. This feature is best illustrated in FIG. 2. In addition, inflatable bladder units 75 and 76 are attached to predetermined portions of their respective cover members 69 and 70 by any fastener arrangement known in the art including stitching or snap connectors. These predetermined portions are best indicated in FIG. 8 and include the overlapping portions depicted in that figure. Cords 90 and 91 terminate in connection fittings 94 and 95 which are detachably secured to buckles 31 and 32 as will be more fully described hereinafter. In addition, storage unit 65 further has attached thereto a pair of lower cords 98 and 99 (see FIG. 2) which interconnect storage unit 65 with connectors 40 and 45 of lap belt unit 35.

Reference will now be made to FIG. 4 in describing a harness assembly 101 adapted to secure an aircraft occupant in ejector seat assembly 1 and to provide attachments to enable deployment of occupant restraint assembly 5 during an ejection sequence. Harness assembly 101 generally comprises a vest worn by the aircraft occupant and includes upper body crossing members 104 and 105 which are removably secured together by a zipper 106. Upper body crossing members 104 and 105 have attached thereto respective connecting clips 107 and 108 by means of extension members 109 and 110 respectively. Clips 107 and 108 have attached thereto connecting members 111 and 112. As will be more fully discussed below, connecting members 111 and 112 are adapted to extend within connection fittings 94 and 95 respectively.

Harness assembly 101 is further provided with an upper body tie 113 formed at one end with a loop connector 114 through which the other end 115 of tie 113 can extend. End 115 is adapted to be attached to itself once placed through loop connector 114 through the use of VELCRO or other similar attachment means. Harness assembly 101 is further provided with leg straps 117 and 118 along with a cross-connection member 121. Cross-connection member 121 hangs from upper body crossing members 104 and 105 by means of support straps 124 and 125.

Connecting members 111 and 112 are interconnected with cross-connection member 121 by means of cords 127 and 128 and connectors 131 and 132. As indicated in FIG. 4, additional cords 135 and 136 are secured to cross-connection member 121 through additional connectors 138 and 139. Cords 135 and 136 are adapted to extend to leg restraining units, such as those disclosed in U.S. Pat. No. 5,072,897 which is hereby incorporated by reference. The particular construction of connectors 131, 132, 138 and 139 are not part of the present invention, are fully described in the '897 patent cited above, and therefore will not be more fully discussed herein.

Cross-connecting member 121 is further attached to a cockpit floor (not labeled) or other structural support remote from ejector seat assembly 1 by means of tension lines 143–146. The functioning of the various interconnections described above will be more fully outlined below.

Reference will now be made to FIGS. 5 and 6 in describing the particular structure of buckles 31 and 32 and clips 107 and 108, along with the manner in which these buckles and clips are interconnected. Since buckles 31 and 32 are constructed in the same manner and clips 107 and 108 are also connected in the same manner, only the construction of buckle 32 and clip 107 will be described and it is to be understood that buckle 31 and clip 108 are structured and function in a similar manner.

Clip 107 is generally square in shape and has a central opening through which a transverse cross pin 153 extends. Clip 107 further includes a hook defining end 155 which includes a notched area 156 adapted to receive a cross pin 157 when clip 107 is inserted within buckle 32. Buckle 32 further includes a lower pivoting member 159 which is adapted to extend about a portion of cross pin 153 of clip 107 after clip 107 is inserted within buckle 32. With this construction, clip 107 can be secured within buckle 32 by two hook-type attachment assemblies. Buckle 32 further includes an upper pivoting member 162 which must be pivoted in order to allow clip 107 to be rotated to release cross pin 157 from notched area 156. Therefore, in order to remove clip 107 from buckle 32, upper pivoting member 162, lower pivoting member 157 and clip 107 must be rotated. Upon insertion of clip 107 within buckle 32, however, these elements are automatically rotated due to frictional contact therebetween such that clip 107 can be easily attached to buckle 32.

When clip 107 is attached to buckle 32, connecting member 111 is automatically received within connection fitting 95. The particular construction of connecting member 111 and connection fitting 95 will now be described with reference to FIGS. 5, 7 and 9. Again, it should be noted that, although not individually discussed, the interconnection between connecting member 112 and connection fitting 94 is performed in a similar manner.

An upper portion of connection fitting 95 is formed with a hole 173 through which cord 91 extends so as to secure cord 91 to connection fitting 95. Connection fitting 95 is secured to buckle 32 by means of a shear pin 175 which has a predetermined shear force tolerance range as will be more fully discussed below. Connection fitting 95 further includes a lower, central opening 177 defined by an annular, inwardly extending flange 180. Opening 177 permits access to an interior chamber 182 of connection fitting 95.

Connecting member 111 comprises an elongated rod 185 having an enlarged conical head 187, a first diametric portion 189, a second reduced diametric portion 191 and a third diametric portion 194. Reduced diametric portion 191 merges with first diametric portion 189 by means of an annular ramping surface 197. Third diametric portion 194 is provided with a slotted area 203 and a notched area 205 located slightly below slotted area 203. Third diametric portion 194 terminates in an externally threaded end 208. Connecting member 111 further includes an elongated sleeve 211 having a plurality of circumferentially spaced holes provided adjacent an upper end thereof. Sleeve 211 is adapted to extend about elongated rod 185 as best shown in FIG. 9. Connecting member 111 further includes a plurality of retention balls 215 which, in a normal use and attaching permitting position, are located in reduced diametric portion 191 and extend slightly into a respective one of the plurality of circumferentially spaced holes 213. A compression spring 218 is further provided about elongated rod 185 and is adapted to extend between elongated sleeve 211 and a cap member 220 which is threadably secured to threaded end 208 of third diametric portion 194. Cap member 220 is provided with a hole 225 through which cord 127 extends so as to attach cord 127 to connecting member 111.

Elongated rod 185 extends out of a housing 225 of connecting member 111 as best shown in FIG. 5. Elongated rod 185 is secured to a mounting clip 227 attached to housing 225 by means of shear pins 228 and 229 which extend through first and second through holes 230 and 231 provided in mounting clip 227. Normally, elongated rod 185 is attached to mounting clip 227 in the manner best shown in FIG. 9 wherein a first shear pin 228 extends through slotted area 203 and first shear pin through hole 230 and a second shear pin 229 extends through notched area 205 and second shear pin through hole 231. As will be discussed more fully below, shear pin 229, that extends through second through hole 231 has a shear force tolerance lower than the shear force tolerance of shear pin 228 extending through slotted area 203 and first through hole 230.

The manner in which a wearer of harness assembly 101 is strapped into ejector seat assembly 1 and the manner in which occupant restrain assembly 5 is deployed during an ejection sequence will now be described. An occupant wearing the harness assembly 101 shown in FIG. 4 enters the cockpit or other area of an aircraft and is seated upon ejector seat assembly 1. Although the particular order of making the various connections described above can be varied, in general the occupant will attach connectors 40 and 45 to buckles or other similar attachments units (not shown) secured to cross-connection member 121. Next, tension lines 143–146 are interconnected between cross-connection member 121 and the floor of the cockpit. This can be done by either attaching connections directly at the cockpit floor or through the use of releasable connectors, similar to connectors 131, 132, 138 and 139 at cross-connection member 121. Finally, clips 107 and 108 will be respectively secured to buckles 32 and 31. Simultaneously, by inserting clips 107 and 108 in buckles 32 and 31, connecting members 111 and 112 will extend into connection fittings 95 and 94 respectively. This connection will take the form shown in FIG. 9 wherein the connecting members 111 and 112 can be readily removed from their respective connection fittings.

During an ejection sequence, which is initiated by the occupant manually engaging ejection control handle 52, initial movement of ejector seat assembly 1 from the aircraft will cause tension in cords 127 and 128 by means of the attachment of these cords with the floor or other structure of the airplane through cross-connection member 121 and tension lines 143–146. This initial tension will cause second shear pin 229 that extends through hole 231 to shear such that elongated rod 185 of connecting member 111 is shifted downward relative to connection fitting 95 to assume the position shown in FIG. 10. At this point, retention balls 215 have ridden up ramping surfaces 197, are in contact with first diametric portion 189 of elongated rod 185, and extend radially outward from spaced holes 213 a combined distance greater than the diameter of lower central opening 177 as clearly shown in FIG. 10.

Further tensioning upon cord 127 causes shear pin 228 which extends through slotted area 203 and first shear pin through hole 230 to shear such that elongated rod 185 becomes completely disengaged from mounting clip 227 and assumes the position shown in FIG. 11. At this point, sleeve 211 fully abuts conical head portion 187 of elongated rod 185 and the tension upon cord 127 causes a downward force to be exerted upon connection fitting 95 by the reactive forces between retention balls 215 and annular flange 180. Finally, the forces upon connection fitting 95 cause pin 175 to shear which causes tension to be applied to cord 91.

At this point, it should be readily apparent that an analogous shearing of connection fitting 94 occurs with respect to buckle 31. Therefore, once connection fittings 94 and 95 are completely disconnected from buckles 31 and 32, cords 90 and 91 will be essentially connected directly to the cockpit floor of the aircraft through cords 127 and 128, tensioning lines 143-146, and the respective connectors described above which, are detached from cross-connection member 121 as discussed in the '897 patent listed above. In general, these connectors are sheared from cross connection member 121 due to reactive forces in a manner generally analogous to the shearing of connecting members 111, 112 and connection fittings 94 and 95 discussed above. As ejector seat assembly 1 continues to be ejected from the aircraft, the forces acting on cords 90 and 91 cause the occupant restraint assembly 5 to be deployed to the position shown in FIG. 8 wherein cover members 69 and 70 act as a shroud to maintain the arms of the occupant close by the occupant's body and inflatable bladder units 75 and 76 extend about and limit the permissible movement of the occupant's head. Further ejection of ejector seat assembly 1 causes tension lines 143-146 to snap thereby completely disconnecting the occupant and the ejector seat assembly 1, along with the occupant restraint assembly 5, from the aircraft. Of course, this entire sequence occurs in a split second and it is only necessary to maintain the position of the occupant's limbs until the ejector seat assembly 1 has fully cleared the aircraft.

By the above description, it should be readily apparent that the occupant restraint assembly according to the present invention can be readily adapted for various uses as it only requires four connecting points and a means to deploy the cover members and inflatable bladder units. It should also be realized that the particular connection arrangements described above for use in securing the occupant restraint assembly 5 to ejector seat assembly 1 can be performed by other connecting arrangements known in the art. In addition, various other changes and/or modifications can be made to the embodiment described above without departing from the spirit of the invention. In general, the invention is only intended to be limited by the scope of the following claims.

I claim:

1. An occupant restraint assembly adapted for attachment to a seat for restraining movement of the upper limbs of an occupant thereof upon occurrence of a prerequisite condition comprising:
   a storage unit;
   means for fixedly securing said storage unit at an upper back support portion of a seat;
   shroud means movable between a stowed position wherein said shroud means is housed within said storage unit and a deployed position wherein first and second cover members of said shroud means extend out of said storage unit, around opposite sides and laterally inward of an upper body portion of the occupant to retain an occupant's arms against the occupant's upper body;
   bladder means movable between a deflated, stowed position within said storage unit and a deployed position wherein said bladder means extends about the occupant's neck;
   means for inflating said bladder means in the deployed position; and
   means for moving said shroud and bladder means from said stowed to deployed positions upon occurrence of the prerequisite condition.

2. An occupant restraint assembly as claimed in claim 1, wherein said bladder means is attached to said shroud means.

3. An occupant restraint assembly as claimed in claim 2, wherein said means for moving said shroud and bladder means comprises strap means carried by said shroud means and means for applying a tension to said strap means.

4. An occupant restraint assembly as claimed in claim 1, wherein said first and second cover members comprise netting.

5. An occupant restraint assembly for use in combination with an aircraft ejector seat assembly removably attached within a cockpit, said ejector seat comprising:
   an occupant seat including a substantially upright back support portion and a lap area;
   a parachute attached to said seat;
   means for ejecting said seat; and
   an ejection control member for activating said ejecting means, and said restraint assembly comprising:
   a storage unit attached to said back support portion of said seat;
   shroud means movable between a stowed position wherein said shroud means is housed within said storage unit and a deployed position wherein said shroud means extends out of said storage unit and around the arms of an occupant of the seat to restrain the movement of the occupant's arms;
   bladder means movable between a deflated, stowed position within said storage unit and a deployed position wherein said bladder means extends about the neck of an occupant of the seat;
   means for inflating said bladder means in the deployed position, and
   means for moving said shroud and bladder means from said stowed to deployed positions, said moving means being responsive to activation of said ejection control member.

6. The combination as claimed in claim 5, wherein said bladder means is attached to said shroud means.

7. The combination as claimed in claim 5, wherein said means for moving said shroud and bladder means comprises strap means carried by said shroud means and means for applying a tension to said strap means.

8. The combination as claimed in claim 7, wherein said shroud means comprises first and second cover members adapted to extend around opposite sides and laterally inward of an occupant's body, about respective arms of the occupant.

9. The combination as claimed in claim 8, wherein said first and second cover members comprise netting.

10. The combination as claimed in claim 8, wherein said ejector seat assembly further includes at least one riser strap connected to said parachute, said strap means including at least one strap member being secured to said at least one riser strap.

11. The combination as claimed in claim 10, wherein said tension applying means releasably interconnects said strap means to the cockpit.

12. The combination as claimed in claim 11, wherein said ejector seat assembly further includes a lap belt unit adapted to extend across said lap area, said restraint assembly being attached to said lap belt unit.

13. The combination as claimed in claim 8, wherein said ejector seat assembly further includes a lap belt unit adapted to extend across said lap area, said restraint assembly being attached to said lap belt unit.

14. The combination as claimed in claim 13, wherein said tension applying means releasably interconnects said strap means to the cockpit.

* * * * *